E. F. MÜLLER.
MACHINE FOR THE MANUFACTURE OF PAPER BAGS.
APPLICATION FILED JAN. 12, 1907.

940,183.

Patented Nov. 16, 1909.

Witnesses.
A. E. Hathaway
A. Morrill

Inventor
E. F. Müller
by R. Haddan
Attorney

E. F. MÜLLER.
MACHINE FOR THE MANUFACTURE OF PAPER BAGS.
APPLICATION FILED JAN. 12, 1907.

940,183.

Patented Nov. 16, 1909.
12 SHEETS—SHEET 2.

Fig. 2

Witnesses
A. E. Hathaway
A. Morrill

Inventor
E. F. Müller
by his Attorney R. Wadden

E. F. MÜLLER.
MACHINE FOR THE MANUFACTURE OF PAPER BAGS.
APPLICATION FILED JAN. 12, 1907.

940,183.

Patented Nov. 16, 1909.

Witnesses
A. E. Hathaway
A. Morrill

Fig. 11

Inventor
E. F. Müller
by R. Haddan
Attorney

Fig. 12

E. F. MÜLLER.
MACHINE FOR THE MANUFACTURE OF PAPER BAGS.
APPLICATION FILED JAN. 12, 1907.

940,183.

Patented Nov. 16, 1909.
12 SHEETS—SHEET 9.

Witnesses
A. E. Hathaway
A. Morrill

Inventor
E. F. Müller
by R. Hadden
His Attorney

E. F. MÜLLER.
MACHINE FOR THE MANUFACTURE OF PAPER BAGS.
APPLICATION FILED JAN. 12, 1907.

940,183.

Patented Nov. 16, 1909.
12 SHEETS—SHEET 10.

Witnesses.
A. R. Hathaway
A. Morrill

Inventor
E. F. Müller
by R. Hudda
Attorney E. F. MÜLLER.
MACHINE FOR THE MANUFACTURE OF PAPER BAGS.
APPLICATION FILED JAN. 12, 1907.

940,183.

Patented Nov. 16, 1909.

E. F. MÜLLER.
MACHINE FOR THE MANUFACTURE OF PAPER BAGS.
APPLICATION FILED JAN. 12, 1907.

940,183.

Patented Nov. 16, 1909.
12 SHEETS—SHEET 12.

UNITED STATES PATENT OFFICE.

EDUARD FELIX MÜLLER, LEIPZIG-REUDNITZ, GERMANY.

MACHINE FOR THE MANUFACTURE OF PAPER BAGS.

940,183.  Specification of Letters Patent.  Patented Nov. 16, 1909.

Application filed January 12, 1907. Serial No. 352,019.

*To all whom it may concern:*

Be it known that I, EDUARD FELIX MÜLLER, a subject of the King of Saxony, residing at Leipzig-Reudnitz, in Germany, have invented a certain new and Improved Machine for the Manufacture of Paper Bags, of which the following is a specification.

This invention relates to an improved machine for the manufacture of paper-bags, more particularly paper-bags with rectangular or so-called square bottoms, the bags being produced from the web by a continuous series of operations due to a continuously rotating drum and accessory rotating machine-parts.

The machine is so constructed that it can be used for manufacturing bags of different sizes, and the bags may be produced with a projecting edge at one side, by means of which they can be held while opening them, without inserting one's hand into the interior thereof.

The invention is illustrated in the annexed drawing in which—

Fig. 19 is a front view and Fig. 20 a side elevation showing the end of the blank in the box form and the two knives which have already entered the box slitting the blank. Fig. 21 is a side view and Fig. 22 a plan view showing the elongation of the box form into the diamond one. Fig. 23 shows the diamond form smoothed down by the smoothing roller. Fig. 24 shows the action of the folding roller folding the diamond form to define the flaps. Fig. 25 shows the diamond form with the glue on it.

Figure 1:
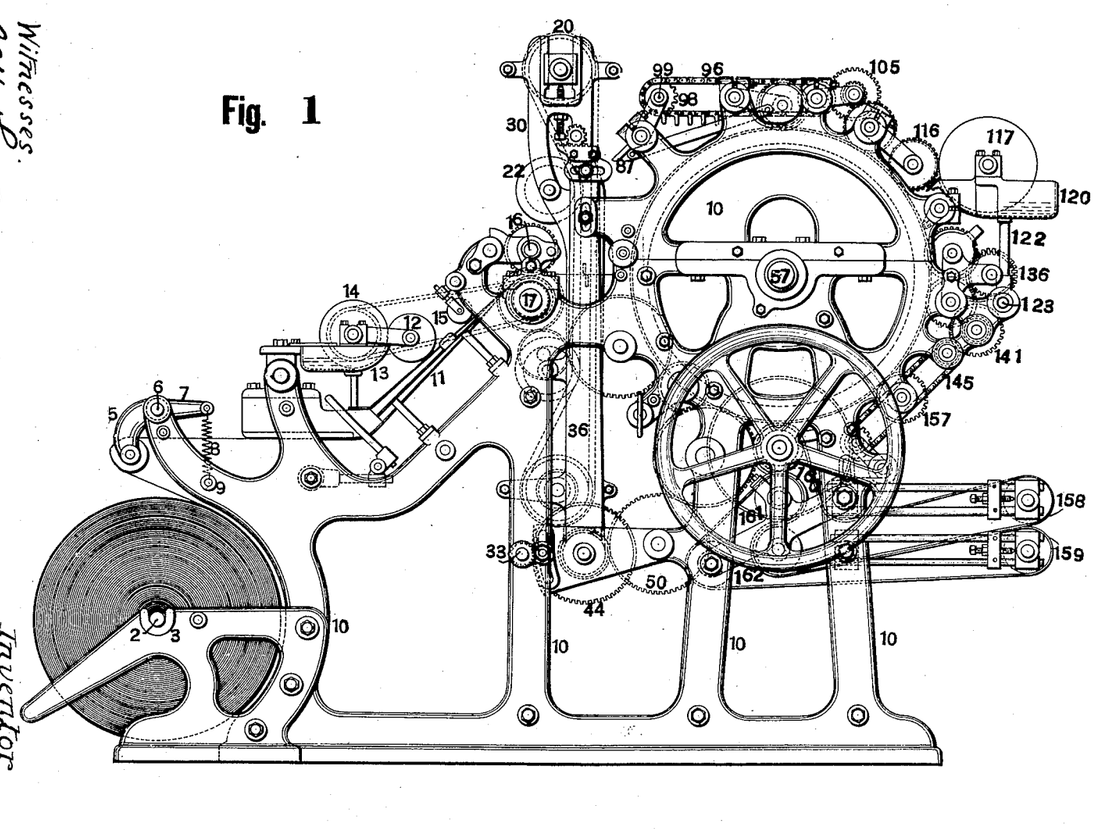
Figure 1 is a side view of the machine, Fig. 2 a partial plan view.

Referring to Fig. 1, the roll of paper 1 is supported by the axle 2, which rests in bearings 3. From the said roll the paper travels over the roller 4, the bearings of which are formed at the ends of levers 5 fulcrumed at 6, the arms 7 of these levers being connected to springs 8 attached to pins 9 fixed to the machine-frame 10. The roller 4, is, therefore, resiliently supported, in order to prevent the tearing of the paper in case of unequal tension.

From the roller 4 the paper passes over the formers 11 and is folded in the known manner into a bellows-sided or tucked tube. The roller 12 receives paste from the roller 14 and trough 13, and pastes one edge of the paper, which is pressed down and fastened by the roller 15. Arrangements of this kind are already known and are used in most machines in which paper-bags are made from the web.

Figure 3:
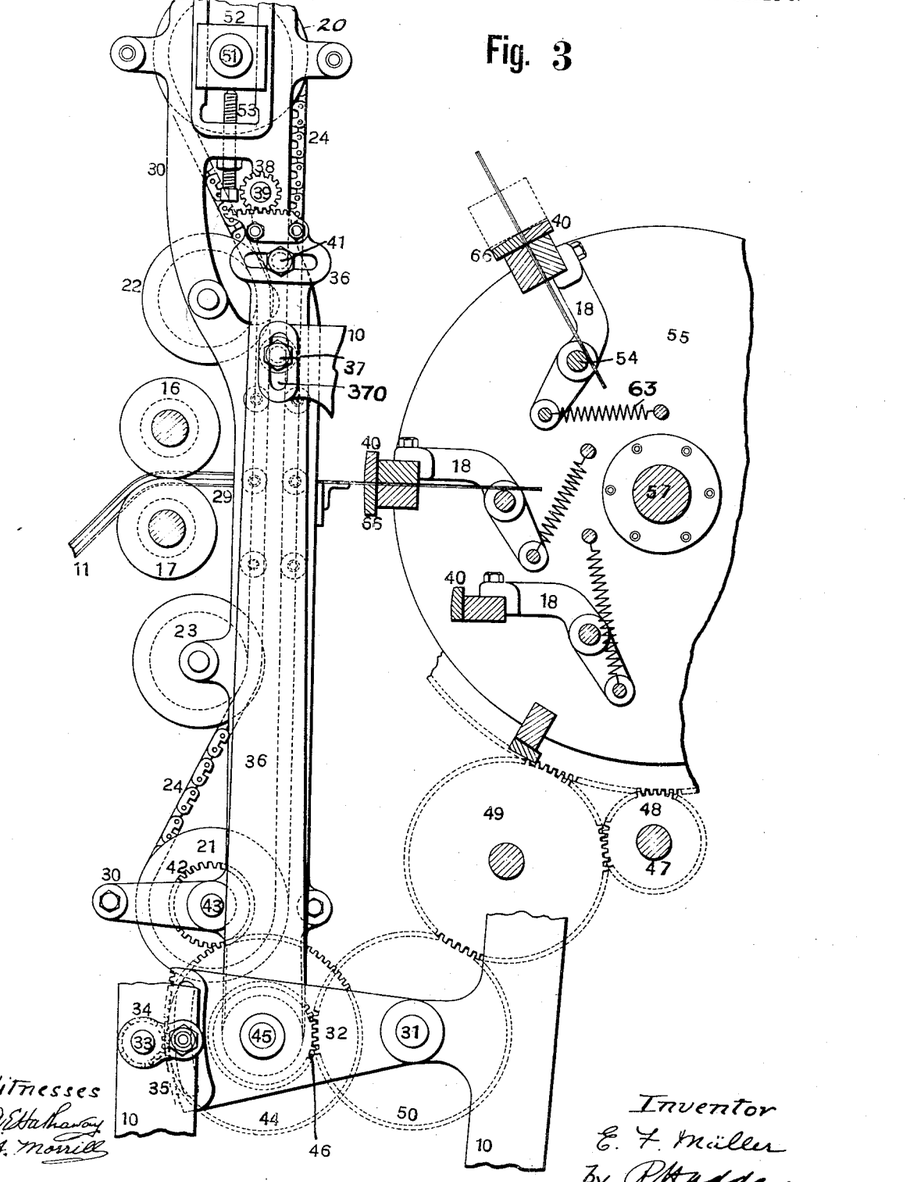
Fig. 3 is a side view of the cutting-off mechanism in connection with the rotatory drum, the latter being shown in section.

The paper tube passes between the feed-rollers 16 and 17 and thence to the cutting mechanism, the tube being cut by the knives 19 at the moment when the front end of the tube is engaged by the grippers 18 (Fig. 3).

Figures 4, 5:
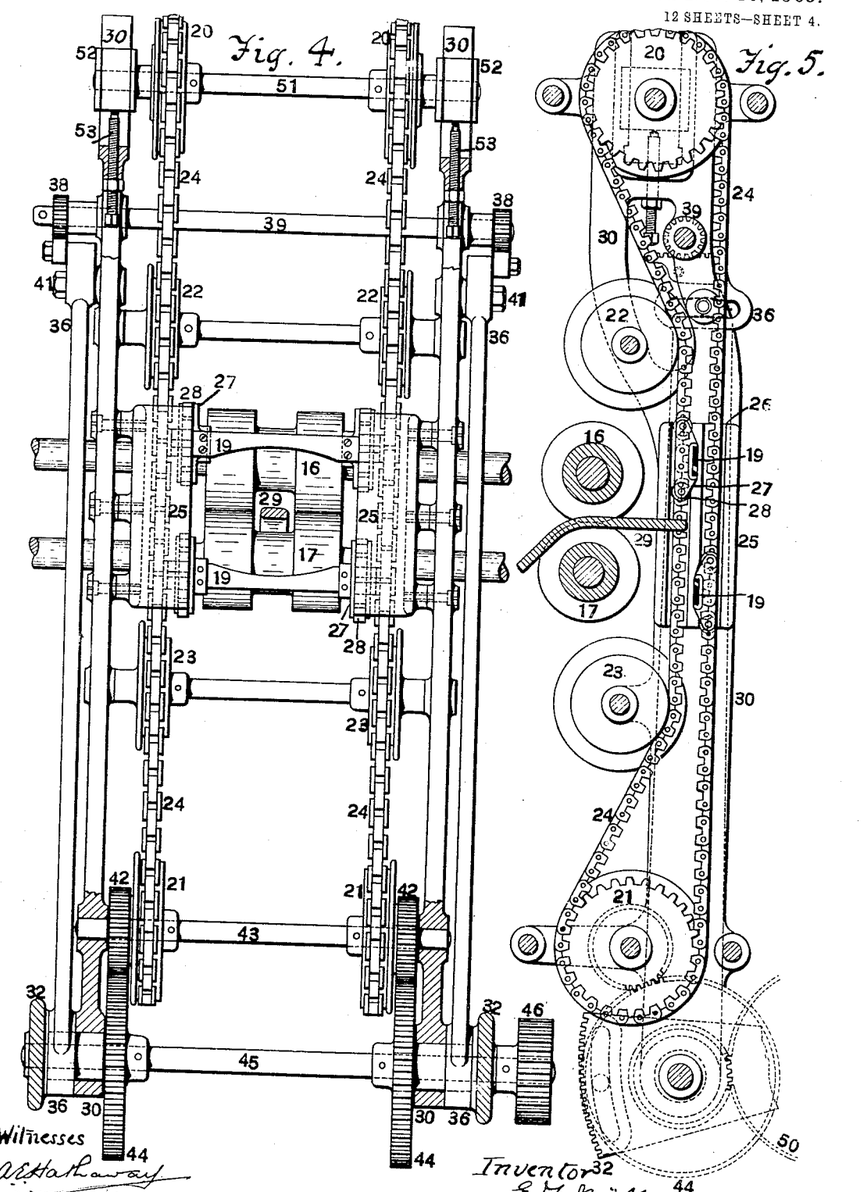
Fig. 4 is a side elevation of the cutting-off mechanism and Fig. 5 is a sectional view thereof.
Figure 6:
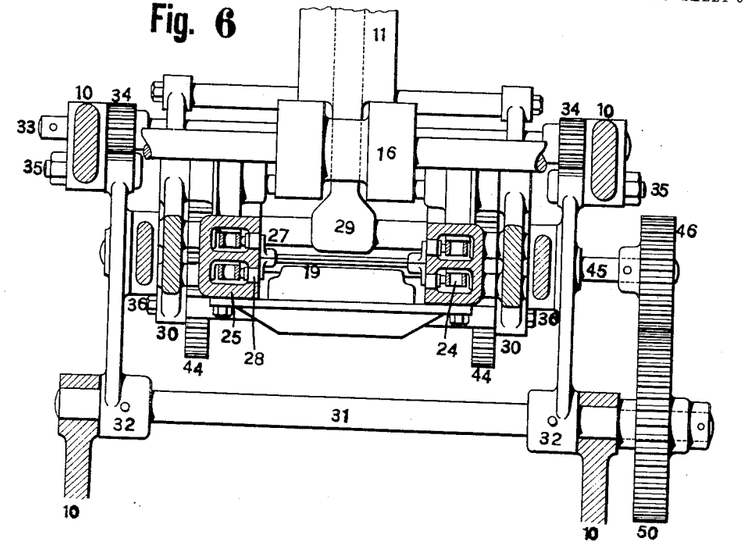
Fig. 6 is a sectional plan view of Fig. 4.

The cutting mechanism (Figs. 3 to 6) comprises the endless chains 24 traveling over the sprocket-wheels 20 and 21, and guide-rollers 22 and 23, the knives 19 being attached to these chains. The velocity of the knives is considerable compared with that of the paper tube, in order to secure a rapid and clean cut. The rollers 22 and 23 guide the chains in such a manner that the knives act in the manner of shears. The guides 25 (Figs. 4 to 6) serve to insure perfect steadiness of the knives during the cutting operation, the knife-holders 27 being provided with anti-friction rollers 28 working in the grooves 26 of the said guides.

Figure 7:
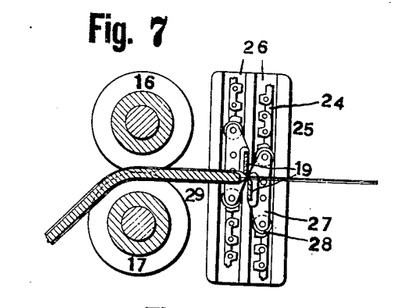
Figs. 7 and 9 show the knives (19) in two different cutting positions relatively to the guide bar (29).
Figure 8:
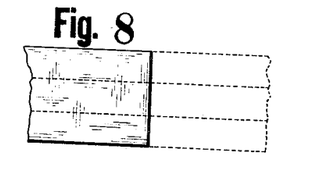
Figs. 8 and 10 represent two different cuts of the tube produced by the different cutting positions as shown in Figs. 7 and 9.
Figure 9:
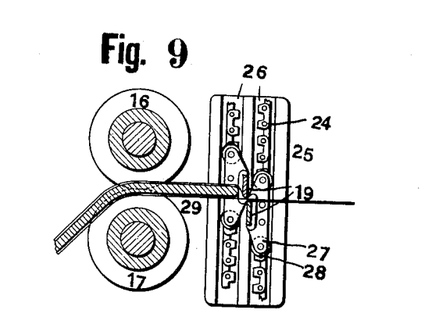
Figure 10:
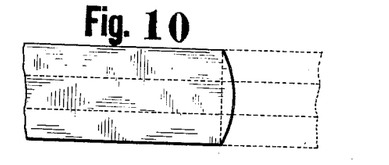
Figure 11:
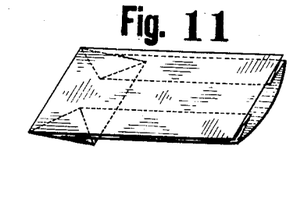
Fig. 11 shows a bag with a rounded edge overlapping the edge of the other side.

The cutting of the paper may take place in various positions of the knives 19, to the guide bar 29 for example the knives may cut the tube exactly in the middle line of the guide-bar 29 (Fig. 7), so that a straight cut is made (Fig. 8) to produce a blank the two sides of which are of equal length, or the cutting operation may take place above or below the guide-bar 29 (Fig. 9) so that one side of the blank has a rounded edge overlapping the edge of the other side (Figs. 10 and 11). The sprocket-wheels 20 and 21 are mounted in the frames 30 pivotally connected to the toothed segments 32 mounted on the shaft 31 (Figs. 1, 3 and 6), the said segments being in mesh with the toothed wheels 34 fixed to the shaft 33, so that by rotating the latter the segments can be raised or lowered to regulate the cutting position of the knives 19 relatively to the guide-bar 29. After adjustment the segments 32 are made fast to the frame 10 by means of screws 35.

Pivotally connected to segments 32 are the two flat levers 36 (Fig. 3), which are adapted to be fixed to the frame 10 by means of screws 370 passing through slots 37 with which the latter is provided. To each lever 36 is bolted a toothed rack meshing with a pinion 38 fixed to the shaft 39, the latter being mounted in the frames 30. Rotation of the shaft 39 therefore rocks the frames 30 on their pivots and allows of adjusting the distance of the knives from the feed-rollers 16, 17. This arrangement allows of exactly regulating the length of paper-tube outside the gripper-bars 40 and 66 when the paper is cut, from this projecting part of the blank the bottom of the bag is subsequently formed. After adjustment the frames 30 are made fast to the levers 36 by means of the screws 41, the said levers being fixed to the frame 10 in the manner already described. The total length of the blank cut is regulated by the circumferential velocity of the feed-rollers 16 and 17, which are driven by means of suitable variable speed-gear. The velocity of the chains 24 and knives 19 is constant, the sprocket-wheels 21 being driven by means of the shaft 43 and toothed wheels 42 in mesh with the toothed wheels 44 fixed to the shaft 45, the wheel 46 fixed to the latter is driven from the driving shaft 47 by means of the toothed-wheels 48, 49 and 50. The shaft 51 of the sprocket-wheels 20 is mounted in bearings 52 (Fig. 3) adapted to be vertically adjusted in the frames 30 by means of screws 53 in order to regulate the tension of the chains 24. Instead of the chains 24, wire ropes or steel bands can of course be used for operating the knives.

Figure 14:
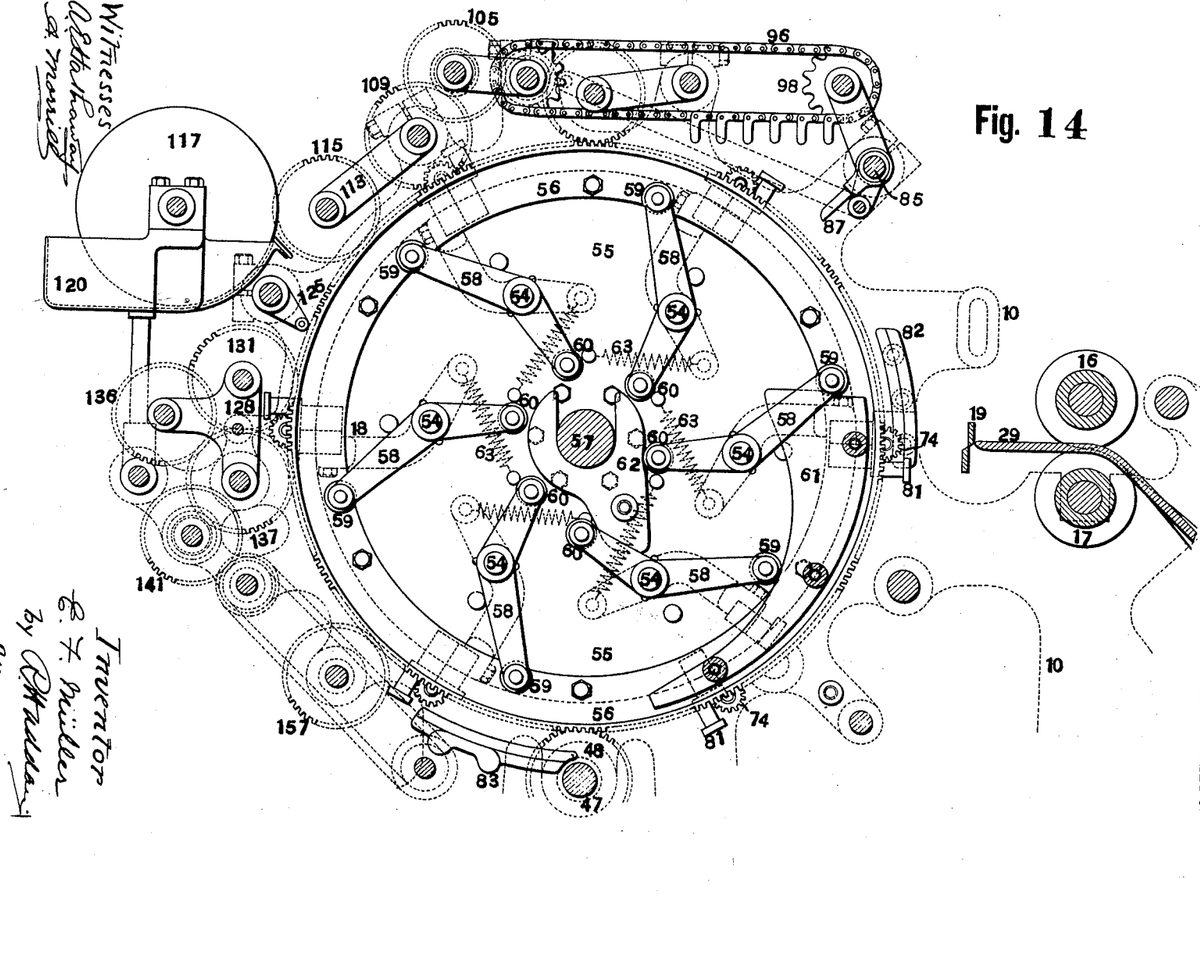

The bars 40, which co-act with the bars 66 to successively grip the blanks, are fixed to levers 18 fulcrumed on shafts 54 between the two disks 55, which are rotated by means of the gear-wheels 56 and 48. To one of the disks 55 is rigidly connected gear 56. The disks 55 are fixed to the shaft 57 and form a kind of drum containing and surrounded by mechanism for the treatment and shaping of the blanks from which the bags are made. The levers 18 are actuated by the springs 63 for closing the grippers, and the latter are opened by means of the levers 58 (Fig. 14) fixed to the shafts 54 outside the drum and provided with rollers 59 and 60 adapted to co-act with the fixed cams 61 and 62. The gripper-bars 66 are fixed by means of intermediate parts 65 (Fig. 24) to the squared rods 64 fixed to the disks 55. Pivotally connected to each part 65 is a tongue-piece 67 resiliently supported by a spring 68 arranged in a box 69 fixed to the respective rod 64 so that the said tongue-piece can yield during the folding of the bottom of the blank. Each of the rods 64 supports two slides 70 (Figs. 2, 15 and 16), to each of which is pivotally connected a member 72. The tongues 71 and 73 are fixed to the parts 70 and 72 respectively. Fixed to the parts 72 are small gear-wheels 74 in mesh with the toothed segments 75 fixed to the shafts 76, to which are fixed, outside the disks 55, levers 77 provided with rollers 78 and co-acting with the fixed cam 79 (Fig. 13), the rollers being held in contact with the latter by the springs 80.

The slides 70 are provided with rollers 81 (Fig. 15) which co-act with the cam-parts 82 fixed to the frame 10, in order to move the slides inward. The cam-parts 83 (Figs. 12, 13 and 14) which are also fixed to the frame 10, serve to move the said slides outward. Screw-spindles provided with hand-wheels 84 (Fig. 15) allow of adjusting the cam-parts 82 in order to regulate the inward movement of the slides 70 according to the size of the blank, but the cam-parts 83 are rigidly fixed to the frame 10 and are so shaped that the slides are always moved back to their outermost positions on the bars 64.

Figure 12:
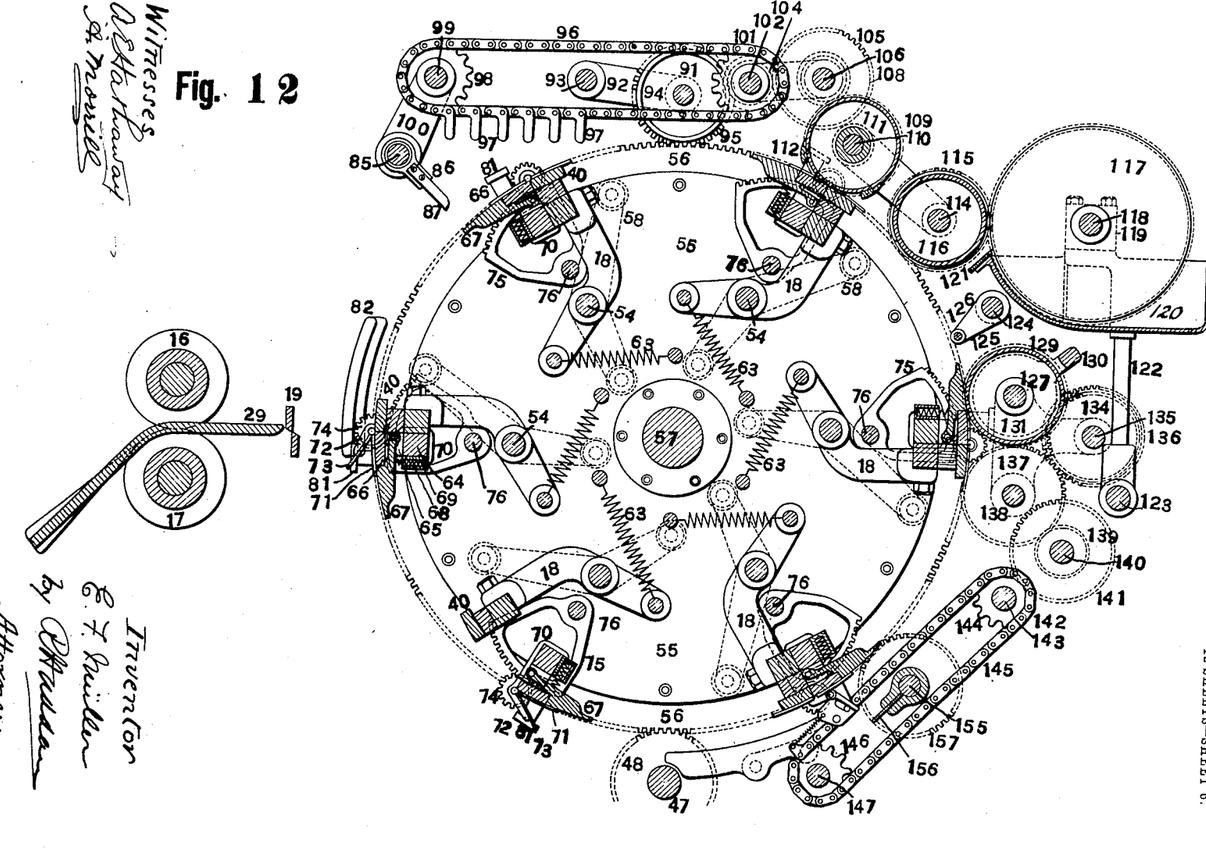
Fig. 12 is a section of the drum and accessory mechanism by means of which the bottoms of the bags are formed.
Figure 13:
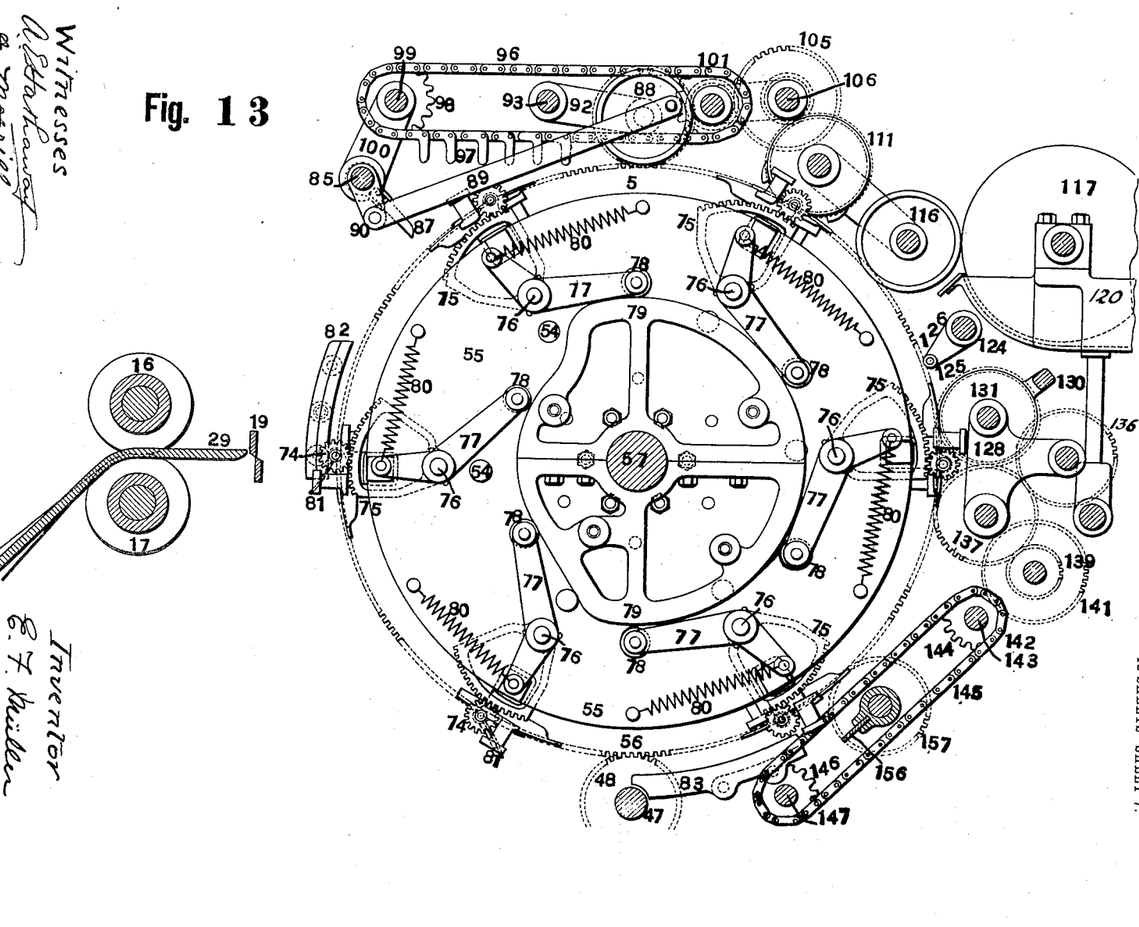
Figs. 13 and 14 represent end views of the drum and accessory mechanism.
Figures 16, 18:
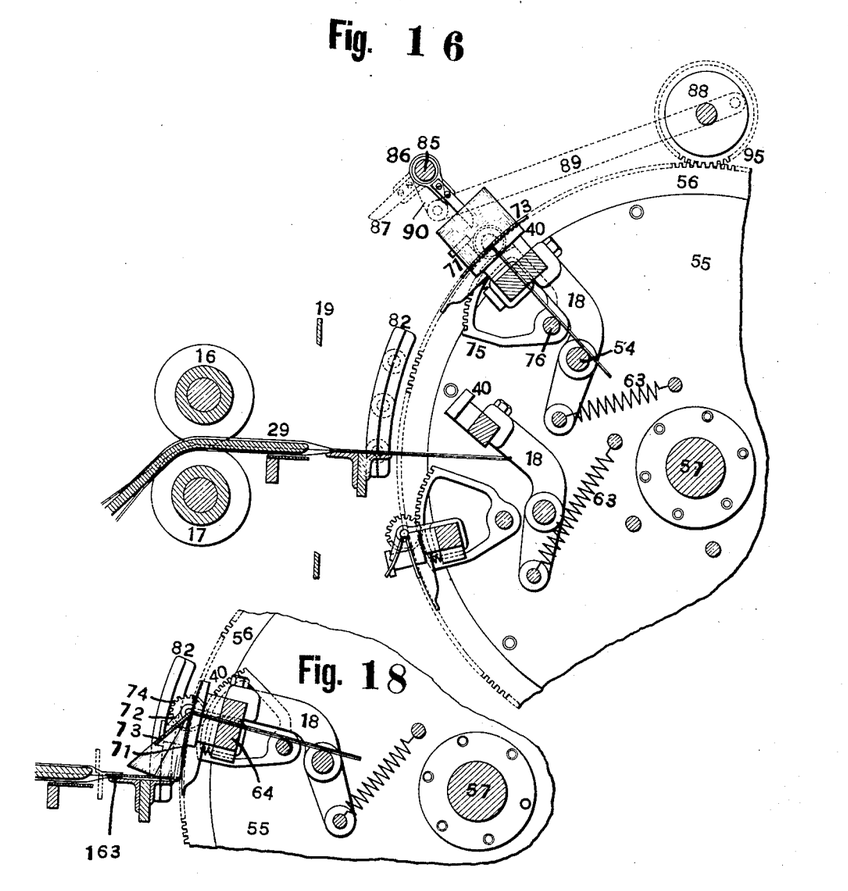

The knives 87 (Figs. 16, 19 and 20) serve to cut the blanks for the purpose of forming the fastening flaps or tongues. The knife-holders 86 are fixed to the shaft 85 mounted in the frame 10 and are adapted to be rocked by means of the crank-wheel 88, connecting-rod 89 and lever 90 (Figs. 13 and 16). The wheel 88 is fixed to the shaft 91 (Fig. 12) carried by the arms 92, which are rigidly connected to fixed rod 93. The rollers 94 on the shaft 91 serve for smoothing the paper. The shaft 91 is driven by the toothed wheel 95 in mesh with the toothed wheel 56.

Figure 2:
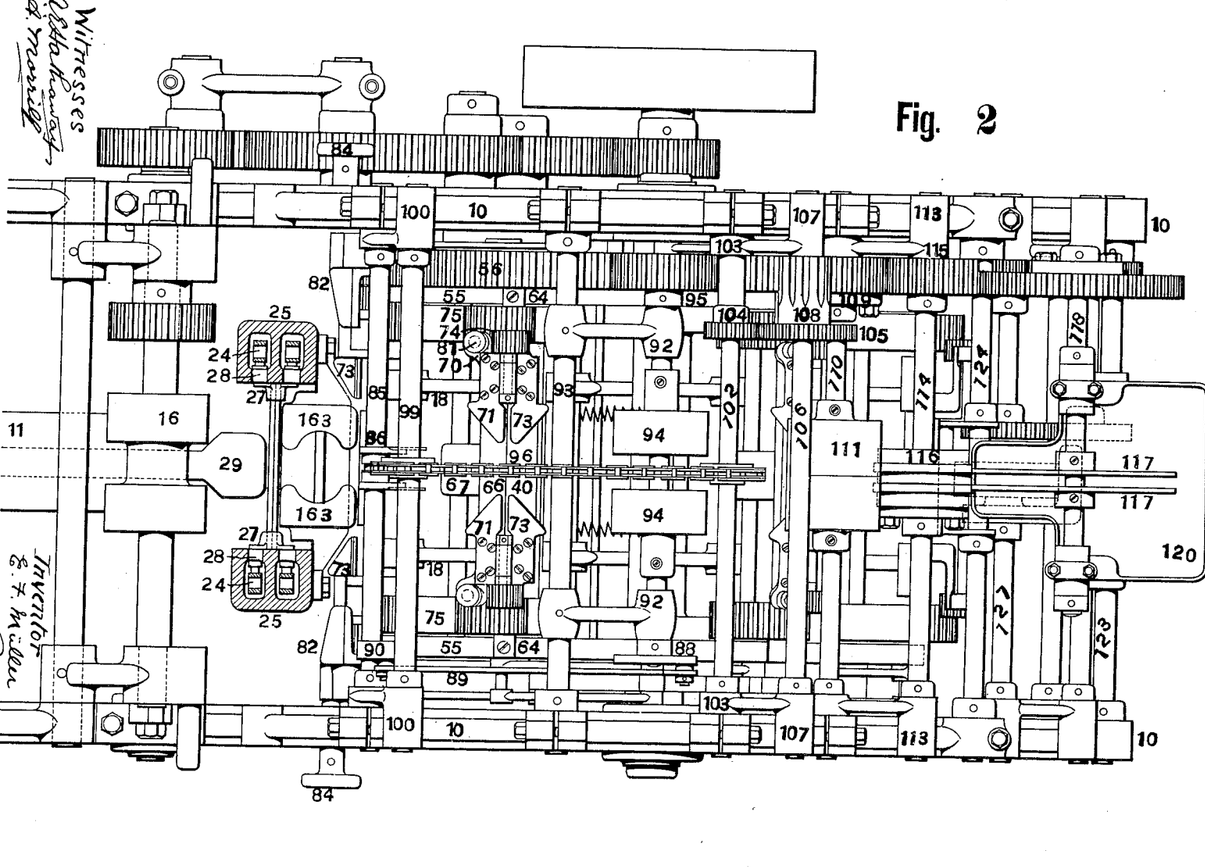
Figures 19, 20, 21, 22, 23, 24, 25:
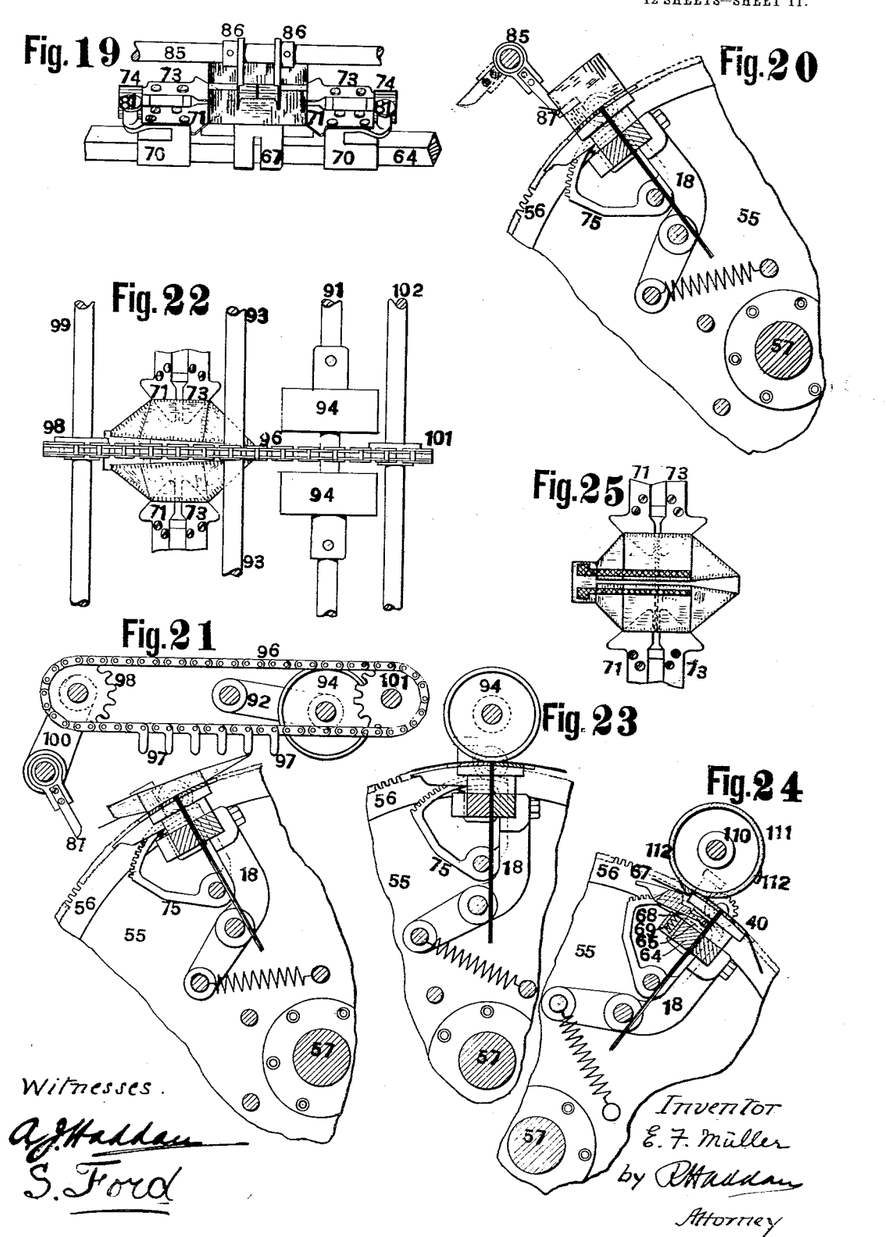
Figures 26, 27, 28, 29, 30, 31, 32, 33:
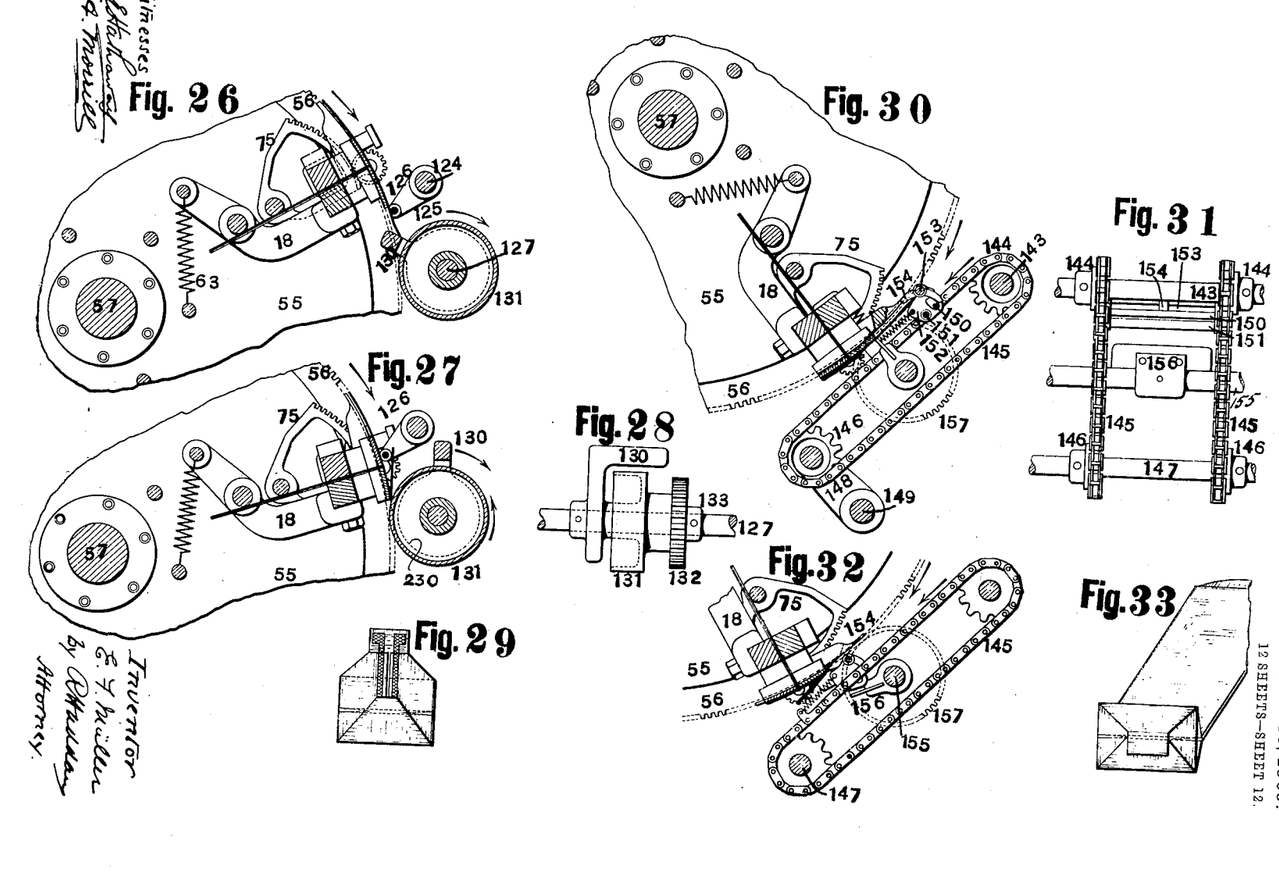
Figs. 26 and 27 represent the action of one of the flap bending over devices in connection with the drum.
Fig. 28 is a detail view of the flap bending finger and press down roller.
Fig. 29 is a blank form on which the bottom is partly finished.
Figs. 30, 31 and 32 show the other flap bending mechanism in different positions
Fig. 33 represents a finished bag.

The endless chain 96 is driven at a speed, the value of which is a multiple of the circumferential velocity of the disk 55. The fingers 97 attached to this chain (see also Fig. 21) serve to elongate the blank (Fig. 22). The chain 96 passes over the sprocket-wheels 98 fixed to the shaft 99, which is mounted in the bearings 100, the chain being driven by the sprocket-wheel 101 fixed to the shaft 102. The latter is mounted in bearings 103 and is driven by means of the toothed wheel 104 (Fig. 2) meshing with the toothed wheel 105 fixed to the shaft 106, which is mounted in bearings 107. The shaft 106 is driven by means of the toothed wheels 108, 109 and 56, the wheel 109 being fixed to the shaft 110. The latter also carries the folding drum 111 (see also Figs. 12 and 24) provided with folding-bars or ribs 112 to determine the width of the bag-bottoms produced. The shaft 114 mounted in the bearing arms 113 is driven by the toothed wheel 115 in mesh with the toothed wheel 56. To the shaft 114 is fixed the pasting roller 116 which applies a coating of paste to the bag-bottom, as shown by the shaded surfaces marked in Fig. 25. Paste is supplied to the roller 116 by the disks 117 (Figs. 2 and 12) which are fixed to the shaft 118 mounted in the bearings 119 formed in the walls of the paste-trough 120. The adjustable gage-bar 121 serves to determine the thickness of the coating of paste. The supports 122 of the trough 120 are fixed to the bar 123 connected to the frame 10. 124 is a bar fixed to the frame 10 and provided with two arms 125 which support the roller 126, the latter being so placed that it is close to the circumference of the drum and nearly makes contact with the outer surfaces of the gripper-bars 40 and 66 during the rotation of the drum (Figs. 12, 26 and 27). This roller 126 serves to hold down the bottom while the front end thereof is being folded.

The shaft 127 is supported by the arms 128 (Figs. 13 and 14) connected to the frame 10 and is driven by the toothed wheel 129 meshing with the toothed wheel 56. Fixed to the shaft 127 is a disk 230 provided with the projection 130 (Figs. 26, 27 and 28), which serves to fold or bend over the front part of the bag-bottom. The projection 130 nearly makes contact with the roller 126. The smoothing roller 131 is loose on the shaft 127, but is positively rotated in the opposite direction, lateral displacement of the said roller being prevented by the collar 133. The toothed wheel 132 fixed to the roller 131 (Fig. 28) meshes with the toothed wheel 134 fixed to the shaft 135 (Fig. 12). The shaft 135 also carries the toothed wheel 136 meshing with the toothed wheel 137, which is carried by the shaft 138 and meshes with the toothed wheel 56. The shafts 135 and 138 are supported by the arms 128. The toothed wheel 137 also drives the pinion 139 fixed to the shaft 140, which is supported by the frame 10 and carries the toothed wheel 141 in mesh with the toothed wheel 142 on the shaft 143 (Figs. 12, 13 and 14), the latter being supported by the frame 10. The sprocket-wheels 144 on the shaft 143 (Figs. 12, 30, 31 and 32) drive the chains 145 which pass over the sprocket-wheels 146 on the shaft 147, the latter being carried by the arms 148 (Fig. 30) fixed to the rod 149 connected to the frame 10. The velocity of the chains 145 is a multiple of the circumferential velocity of the drum. The two chains are inter-connected by the rods 150 and 151 (Fig. 31). To the rod 150 are connected the small, spring-actuated levers or plates 152, which carry the roller 153 serving to press down the fastening flap of the bag-bottom when the said flap has been folded over by the resilient finger 154 arranged midway between the chains. The shaft 155 supported by the frame 10 and driven by the gear-wheels 157 and 56 is provided with the finger 156 which approach to within a short distance of the gripper-bars 40 and 66 and serves to hold down the bag-bottom while the fastening-flap is being folded.

The feed-bands 158 and 159 (Fig. 1) deliver the finished bags from the machine after the said bags have been acted on by the rollers 160, 161 and 162 to fasten down the pasted parts.

Figure 15:
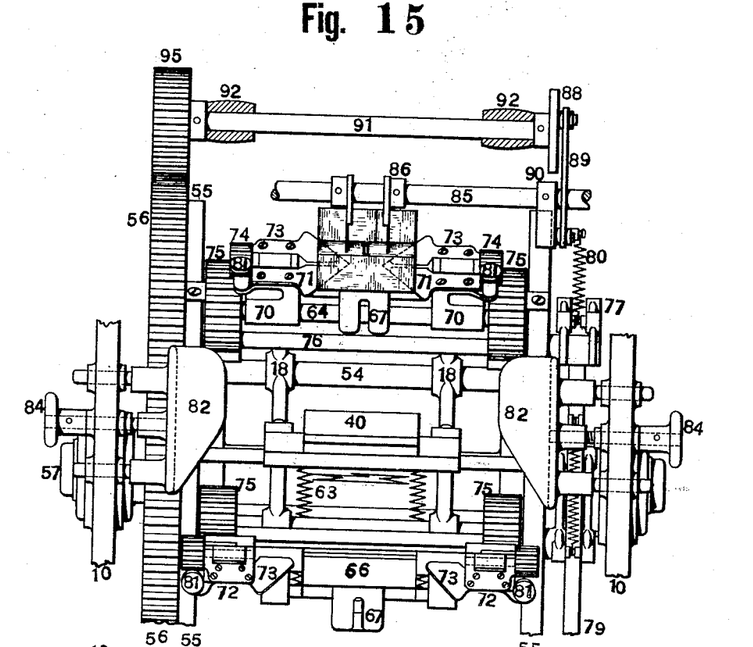
Fig. 15 is a partial front view of the drum and Fig. 16 the side view thereof; both figures showing the beginning of the operation of feeding the tube into one of the grippers of the rotatory drum. The same figures show a blank in another gripper where the box form has been already finished.
Figure 17:
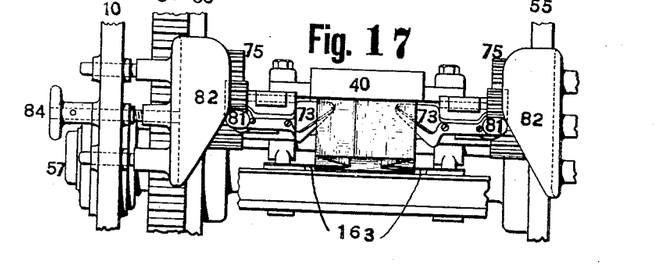
Fig. 17 is a front view and Fig. 18 the side elevation showing a blank gripped and where the tongues of the slides are about to enter the side folds of the blanks to generate the box form.

The action of the machine described is as follows: The paper from the roll 1 passes to the formers 11 in the manner already described, and is made into a tucked tube the joint being pasted and fastened down by the rollers 12 and 15. The tube thus formed is fed by the rollers 16 and 17 to the knives 19, which cut off suitable lengths thereof for treatment by the mechanism connected to the continuously rotating drum. The gripper-bars 40 and 66 seize the end of the paper-tube at the moment at which the latter is cut by the knives 19, and that portion of the blank which projects from the grippers after the cutting of the tube is of the length required to produce therefrom the bottom of the bag. When the rotation of the drum has moved the blank into the position indicated in Fig. 18, the plates 163 engaging the lateral folds of the blank spread out the projecting portion of the latter and enable the tongues 71 and 73 (Figs. 17 and 18) to engage the said folds. The spreading plates 163 are represented in the Figs. 2, 17 and 18. They consist of two plates fastened in any suitable manner to the frame 30 on the cutting-off mechanism. The spreading plates 163 lie in the side folds of the tube; as soon as knives 19 are about to cut off a blank length and one of the grippers of the drum has taken the blank along in the position indicated in Figs. 17 and 18 the plates 163 naturally spread or open out the side folds of the blank. In this position the blank is not in line any more with the tube or spreading plates and as the spreading plates hold back the portion of the blank projecting from the gripper, the side folds have to open out. Those two plates form a very simple means of opening out the side folds far enough that the tongues of the slides can enter the folds to generate the box form. During the continued rotation of the drum the tongues are forced inward by the contact of the rollers 81 with the cam-pieces 82. Thereupon the tongues 73 are rotated by means of the toothed wheels 74 and segments 75, in order to impart a box-like shape to the projecting part of the blank, as shown in Fig. 15. At the proper moment the two knives 87 are rocked from the position indicated by dotted lines in Fig. 16, so that they enter the open end of the blank and make, during the further rotation of the drum, two slits in the wall of the blank. A fastening-flap or tongue for the bottom of the bag is thus produced.

At the next stage of the operation the aperture at the projecting end of the blank is elongated by means of the fingers 97 attached to the rapidly moving chain 96 (Figs. 21 and 22) and the blank is then acted on by the smoothing rollers 94 (Fig. 23). Thereupon the blank is bent or folded by means of the ribs 112 (Fig. 24) and pasted by means of the rollers 116 (Fig. 25). The projection or finger 130, the movement of which is opposed to the movement of the drum, then lifts and folds back the front part of the blank while the remainder of the latter is held fast by the roller 126, the part folded back being then pressed down by the roller 131 (Fig. 28). During the continued rotation of the drum the resilient finger 154, projecting through the slot in the plate or tongue 67 and moved at relatively high speed by the chains 145, pushes forward the fastening-flap, which is then pressed down by the roller 153. By this operation the production of the paper-bag is practically completed. The slides 70 with the tongues 71 and 73 are moved back to their original positions by the cam-parts 83, the tongues 73 being also rotated into normal position, whereupon the grippers are opened to deliver the bag to the conveyers 158 and 159 (Fig. 1), after the pasted joints have been finally fastened down by means of the rollers 160, 161 and 162.

The machine described has over the paper-bag machines hitherto known the advantage that it can be driven at relatively high speed, owing to the practically exclusive use of rotary machine-parts, and the advantage that by adjusting a small number of machine-parts bags of different lengths and widths can be produced. The bags produced are relatively strong and durable, owing to the absence of angular incisions and cut off corners and the cuts which are made are smooth, so that there is no risk of the adhesion of small fragments of paper which may enter the bags and become mixed with the articles subsequently placed in the latter. Another advantage of the bags produced lies in the fact that it is not necessary to insert one's hand into them for the purpose of opening them for use; the curved edge given to one side of the blank, and the formation of the bottom resulting therefrom, causes the bag to open readily when "blown out". Moreover, the overlapping edge results in the production of a broader fastening-flap, which is of great importance for obtaining a strong bottom.

What I claim as my invention and desire to secure by Letters Patent of the United States is:—

1. In a paper bag machine the combination with a rotatory drum of a pair of drawing rolls for advancing the tube into the interior of the rotatory drum, a cutting-off mechanism supported between the drawing rolls and the drum, a plurality of gripping devices and means for operating the cutting-off mechanism and gripping devices so timed that the latter grip the tube at the same moment the cutting-off mechanism is severing off from the tube a length of a blank, the tube being gripped on the line on which the bottom is opened.

2. In a paper bag machine the combination of a rotatory drum, a pair of drawing rolls for advancing the tube, a cutting-off mechanism supported between the drawing rolls and the rotatory drum, grippers in the said drum, a series of formative devices adapted for the successive stages of forming the bottoms of the bags, disposed about said drum and means carried by the drum for operating said formative devices, means for successively operating said grippers to engage the paper tube on the line on which the bottom is opened and at the moment the cutting-off mechanism supported between the drawing rolls and the drum is cutting the tube to form blanks of predetermined length the relative positions of the cutting mechanism and grippers being such that the portions of the blanks projecting from the grippers are of the size required to form the bottom of the bags and means to shift the cutting-off mechanism away from and toward the rotatory drum for adjusting the length of the tube projecting from the grippers according to the different lengths required for the bottoms of the different sizes of bags.

3. In a paper bag machine the combination with a rotatory drum of a pair of drawing rolls for advancing the tube into the interior of the rotatory drum, cutting-off mechanism supported between the drawing rolls and the rotatory drum, means for adjusting the cutting-off mechanism to cut off the tube at a certain distance desired from the periphery of the rotatory drum according to the bottoms of the different sizes of the bags, a plurality of grippers located within said drum, together with levers and cam for opening said grippers and springs for closing the same.

4. In a paper bag machine the combination with a rotatory drum of a pair of drawing rolls for advancing the tube into the interior of the rotatory drum, a cutting-off mechanism supported between the drawing rolls and the drum, means for adjusting the cutting-off mechanism to cut off the tube at a certain distance desired from the periphery of the rotatory drum according to the bottoms of the different sizes of the bags, a plurality of grippers carried by said drum, and a series of formative devices comprising bars and slides mounted on said bars fixed between the walls of the drum, said slides being provided with pivoted tongues serving to open the bottom part of the blank into a box shape, and cams for alternately moving said slides toward the central plane of the drum and away from said plane.

5. In a paper bag machine the combination with a rotatory drum of a pair of drawing rolls for advancing the tube into the interior of the rotatory drum, a cutting-off mechanism supported between the drawing rolls and the drum, means for adjusting the cutting-off mechanism to cut off the tube at a certain distance desired from the periphery of the rotatory drum according to the bottoms of the different sizes of the bags, a plurality of grippers carried by said drum and a series of formative devices comprising bars and slides mounted on said bars fixed between the walls of the drum, said slides being provided with pivoted tongues serving to open out the part for the bottom of the blank into a box form, cams 82 for alternately moving said slides toward the central plane of the drum, said cams 82 being adjustable to determine the travel of the slides according to the different sizes of the bags, and cams 83 to move the slides away from said plane.

6. In a paper bag machine the combination with a rotatory drum of a pair of drawing rolls for advancing the tube into the interior of the rotatory drum, a cutting-off mechanism supported between the drawing rolls and the rotatory drum, a plurality of grippers carried by said drum and a series of formative devices adapted for the successive stages of forming the bottoms of the bags, disposed about said drum, and means carried by the drum for operating said formative devices, said formative devices comprising two knives arranged adjacent the circumference of the drum and a crank-shaft adapted to be rocked by the drum for the purpose of operating the knives to slit the blanks for the purpose set forth.

7. In a paper bag machine the combination with a rotatory drum of a pair of drawing rolls for advancing the tube into the interior of the rotatory drum, a cutting-off mechanism supported between the drawing rolls and the rotatory drum, a plurality of grippers carried by said drum and a series of formative devices adapted for the successive stages of forming the bottoms of the bags, disposed about said drum, and means carried by the drum for operating said formative devices, said formative devices comprising an endless chain arranged adjacent the circumference of the drum and adapted to be actuated by the latter to travel with a velocity which is high compared with that of the drum, said chain being provided with fingers adapted to elongate the projecting box form of the blanks into the diamond form.

8. In a paper bag machine the combination with a rotatory drum of a pair of drawing rolls for advancing the tube into the interior of the rotatory drum, a cutting-off mechanism supported between the drawing rolls and the rotatory drum, a plurality of grippers carried by said drum and a series of formative devices adapted for the successive stages of forming the bottoms of the bags, disposed about said drum, and means carried by said drum for operating said formative devices, said formative devices comprising an endless chain arranged adjacent the circumference of the drum and adapted to be actuated by the latter to travel with a velocity which is high compared with that of the drum, said chain being provided with fingers adapted to elongate the projecting box forms of the blanks into the diamond forms and a smoothing roller adapted to flatten out the elongated diamond forms.

9. In a paper bag machine the combination with a rotatory drum of a pair of drawing rolls for advancing the tube into the interior of the rotatory drum, a cutting-off mechanism supported between the drawing rolls and the rotatory drum, a plurality of grippers carried by said drum and a series of formative devices adapted for the successive stages of forming the bottoms of the bags, disposed about said drum, and means carried by the drum for operating said formative devices said formative devices comprising means for folding the diamond form of the blanks to form bag bottoms and a disk adjacent the circumference of the drum and adapted to be rotated so that the adjacent circumferential surfaces move in opposite directions, said disk being provided with a finger adapted to lift and fold back the leading edges of the diamond forms and a roller to press down the folded flap of the diamond fold.

10. In a paper bag machine the combination with a rotatory drum of a pair of drawing rolls for advancing the tube into the interior of the rotatory drum, a cutting-off mechanism supported between the drawing rolls and the rotatory drum, a plurality of grippers carried by said drum and a series of formative devices adapted for the successive stages of forming the bottoms of the bags disposed about said drum and means carried by the drum for operating said formative devices, said formative devices comprising means for folding the blanks to form bag bottoms and a resiliently supported finger adjacent the circumference of the drum and adapted to be actuated to move at a speed which is high compared with that of the drum, for the purpose of lifting and folding over the trailing edges of the blanks.

In witness whereof I have signed this specification in the presence of two witnesses.

EDUARD FELIX MÜLLER.

Witnesses:
   FRITZ V. KELLER,
   RUDOLPH FRICKE.